United States Patent [19]

Park et al.

[11] Patent Number: 4,832,775

[45] Date of Patent: May 23, 1989

[54] COMPOSITE STRUCTURE BASED ON POLYSTYRENE FOAM AND ORIENTED POLYPROPYLENE FILM AND THERMO-FORMED ARTICLES FABRICATED THEREFROM

[75] Inventors: Hee C. P. Park, Pittsford; John R. Wagner, Jr., Rochester, both of N.Y.

[73] Assignee: Mobil Oil Corporation, New York, N.Y.

[21] Appl. No.: 51,806

[22] Filed: May 20, 1987

[51] Int. Cl.$^4$ .................. B32B 31/00; B32B 7/12; B32B 27/30

[52] U.S. Cl. .................. 156/272.6; 156/307.5; 156/332

[58] Field of Search .............. 428/317.1, 317.3, 317.7, 428/317.9, 319.7, 319.9, 910, 314.4, 314.8, 516; 156/272.6, 307.5, 332

[56] References Cited

U.S. PATENT DOCUMENTS

| | | | |
|---|---|---|---|
| 3,531,367 | 9/1970 | Karsten | 428/317.7 |
| 3,619,344 | 11/1971 | Wolinski et al. | 428/317.7 |
| 3,753,769 | 8/1973 | Steiner | 428/331 |
| 4,008,347 | 2/1977 | Amberg et al. | 428/35 |
| 4,036,675 | 7/1977 | Amberg et al. | 156/245 |
| 4,058,645 | 11/1977 | Steiner | 428/331 |
| 4,062,712 | 12/1977 | Stark | 156/244 |
| 4,101,050 | 7/1978 | Buckler et al. | 229/3.5 R |
| 4,111,349 | 9/1978 | Buckler et al. | 229/3.5 R |
| 4,363,848 | 12/1982 | Le Duc et al. | 428/286 |
| 4,377,616 | 3/1983 | Ashcraft et al. | 428/213 |
| 4,528,221 | 7/1985 | Komatsuzaki et al. | 428/319.9 |
| 4,563,388 | 1/1986 | Bonk et al. | 428/317.3 |
| 4,565,733 | 1/1986 | Akao | 428/317.1 |
| 4,578,297 | 3/1986 | Duncan | 428/35 |

*Primary Examiner*—William J. Van Balen
*Attorney, Agent, or Firm*—Alexander J. McKillop; Charles J. Speciale

[57] ABSTRACT

A composite structure includes a polystyrene foam substrate bonded on at least one major surface to an oriented polypropylene film employing an acrylic adhesive composition. In addition to its other advantageous characteristics, the bond strength between the polystyrene foam and the oriented polypropylene film components of the composite structure is unusually high. The composite can be readily thermoformed into a variety of useful articles such as disposable cups, plates, cartons, containers, and the like.

11 Claims, No Drawings

COMPOSITE STRUCTURE BASED ON POLYSTYRENE FOAM AND ORIENTED POLYPROPYLENE FILM AND THERMO-FORMED ARTICLES FABRICATED THEREFROM

BACKGROUND OF THE INVENTION

This invention relates to a composite structure in which at least one surface of a polystyrene foam substrate is adhesively bonded to an oriented polypropylene film and to thermoformed articles such as disposable cups, plates, cartons, containers, etc., fabricated from such composite.

Composite structures in which a polymer foam such as a polystyrene foam is faced with a polyolefin sheet or film and thermoformed articles such as containers formed from the composites are known.

U.S. Pat. No. 3,531,367 describes a sandwiched panel of foamed polyethylene and polyolefin sheet. The panel is made by wetting the surface(s) of the polyolefin sheet with a solution of polystyrene in a solvent in which the polystyrene foam is soluble and pressing the wetted surface(s) onto the surface(s) of the foamed polystyrene until a bond is set between the surface(s).

U.S. Pat. No. 4,008,347 describes a laminate of polystyrene foam and unoriented polyolefin film, e.g., unoriented polypropylene film, in which the film is secured to the foam using as a heat-sensitive adhesive a vinylic polymer such as ethylene-vinyl acetate copolymer or vinyl acetate maleate copolymer, or polyamide resin, which is dispersed in an emulsion or solvent carrier. The film is coated with the adhesive emulsion/solvent solution which is permitted to dry before laminating the film to the foam under heat and pressure. The laminate is formed into a receptacle such as a cup, picnic plate, container or closure employing vacuum-thermoforming. The use of oriented polyolefin films, including biaxially oriented film, is avoided in the construction of the laminate since, according to the patent, such a film has a greater tendency to wrinkle and is more difficult to secure firmly to a foam base than unoriented polyolefin film.

U.S. Pat. No. 4,111,349 describes cups, plates, trays or containers obtained by thermoforming a coextruded laminate of a filled, optionally foamed, polystyrene possessing at least one layer of a polyolefin, preferably polypropylene, bonded thereto employing an adhesive such as ethylene-vinyl acetate copolymer, ethylene-ethyl acrylate copolymer, ethylene-isobutylate copolymer, chlorinated polyethylene, styrene-butadiene block copolymer, epoxy resin or mixture thereof.

U.S. Pat. No. 4,578,297 describes a heat-resistant laminate capable of being thermoformed to provide a container which will maintain its structural and mechanical properties while subjected to microwave energy. The laminate is obtained by affixing one or both surfaces of a thermoplastic polymer foam, e.g., a polyethylene, polypropylene or polystyrene foam, to a biaxially oriented, opaque film possessing a void-containing polypropylene core layer and a void-free polypropylene skin layer (i.e., a foam as described in U.S. Pat. No. 4,377,616) with or without bonding adhesives. In one non-adhesive lamination operation, a "sandwich" of foam and oriented film surface layers is placed in a mold of desired configuration, e.g., that of a container, with subsequent application of heat and pressure providing the laminate in the form of the finished article. In another non-adhesive lamination procedure, the surface of the foam is superficially melted with the opaque film then being applied thereto. The only adhesive bonding technique mentioned employs an adhesive based on ethylene-vinyl acetate copolymer.

Several of these disclosures, e.g., U.S. Pat. Nos. 4,008,347 and 4,036,675, recognize the difficulty of achieving good bond strength between a polystyrene foam substrate and a polyolefin film, particularly oriented polypropylene film.

It is an object of the present invention to provide a polystyrene foam/oriented polypropylene film composite demonstrating high bond strength between the foam and film components of the structure and exhibiting improved microwaveability.

It is yet another object of the invention to provide a simple, economical method for manufacturing such a polystyrene foam/oriented polypropylene film composite and thermoformed articles therefrom.

SUMMARY OF THE INVENTION

By way of realizing the foregoing and other objects of the invention, a composite foam/film structure is provided which comprises:
(a) a polystyrene foam substrate;
(b) oriented polypropylene film applied to at least one major surface of the polystyrene foam substrate; and,
(c) an acrylic adhesive component securing the polypropylene film to said major surface of the polystyrene foam substrate.

The foregoing composite foam/film structure can be easily shaped by such known and conventional processes as thermoforming to provide numerous types of useful articles including cups, bowls, plates, trays, cartons, containers, closures, and the like. The composite and articles fabricated therefrom are highly resistant to delamination and exhibit excellent levels of puncture, flex-crack, grease and abrasion resistance, moisture barrier properties and resiliency. In addition, when subjected to microwave energy, especially when in contact with edible materials containing fats and/or oils, the polypropylene film of the composite herein provides a higher melting food-contact layer which reduces the possibility for contamination of the edible material by the underlying polystyrene foam.

DESCRIPTION OF THE PREFERRED EMBODIMENTS

The substrate component of the composite structure herein is based on foamed polystyrene, a material which is well known in the art. When an article fabricated from the composite structure of this invention is intended to come into contact with food, e.g., a cup, bowl, plate, etc., it is preferred that the polystyrene foam be a grade suitable for food use. Preferred polystyrene foams have a foam density of from about 4 to about 25, and preferably from about 8 to about 18, $lb/ft^3$ and an average thickness of from about 10 to about 150, and preferably from about 20 to about 80, mils. The foam can be unfilled or filled, examples of the latter being described in U.S. Pat. Nos. 4,101,050 and 4,111,349, the disclosures of which are incorporated by reference herein.

The film component of the composite structure herein is a molecularly oriented, isotactic polypropylene. After extrusion of the base polypropylene film utilizing conventional extrusion techniques, the film is heated and molecularly oriented by stretching it in both a longitudinal and transverse direction. The resultant oriented film exhibits greatly improved tensile and stiffness properties. Typical stretching parameters are 2 to 10 times in the machine direction (MD) and 2 to 5 times in the transverse direction (TD). Known and conventional blown film and tenter frame technology can be used to provide the oriented polypropylene film component of the present composite structure.

If desired, the polypropylene film can be provided as one layer of a multilayer, or laminated, film structure preferably by known and conventional techniques of coextrusion. For example, the outer surface, i.e., the exposed surface, of the polypropylene film can be provided with a coextruded skin layer based on a polyolefin resin, e.g., a polyethylene such as a high pressure, low density polyethylene (HPLDPE) or a linear low density polyethylene (LLDPE) or even a polypropylene of different characteristics, which is of less, equivalent or greater thickness than the underlying polypropylene layer.

One such multilayer film construction which can be used herein is the opaque oriented film described in U.S. Pat. No. 4,377,616 referred to earlier. This film comprises an opaque, void-containing, relatively thick polypropylene core layer surfaced with transparent, void-free, relatively thin thermoplastic skin layers, e.g., based on a polypropylene of similar properties as that used to provide the core layer but lacking the opaquing voids of the latter.

Many other laminated film structures incorporating an oriented polypropylene layer can be employed as the film component of the composite of this invention.

The average thickness of the oriented polypropylene film/component, whether provided as a monolayer or as a multilayer structure, can vary widely with overall thicknesses ranging from about 0.3 to about 20 mils or more, and preferably from about 0.2 to about 10 mils, usually being quite suitable.

It is, of course, within the scope of this invention to bond more than one surface of the polystyrene substrate to an oriented polypropylene film. Thus, a sheet of polystyrene foam can be bonded on both of its major surfaces to the film.

The adhesive component is an acrylic-based composition which is, or can be made, tacky or semi-liquid at bonding temperature, but also provide acceptable adhesion strength when the composite is subjected to such post-manufacturing operations involving the application of heat as thermoforming. Ordinarily, then, the acrylic-based adhesive herein will exhibit a softening temperature of about 170° F. and above. Acrylic resins which are especially useful in bonding the polystyrene foam substrate and oriented polypropylene film are described, for example, in U.S. Pat. Nos. 3,753,769 and 4,058,645, the contents of which are incorporated by reference.

The heat sealable acrylic-based polyolefin film coating composition of U.S. Pat. No. 3,753,769 comprises an interpolymer of (1) from about 2 to about 15, and preferably from about 2.5 to about 6, parts by weight of an alpha, beta-monoethylenically unsaturated carboxylic acid selected from the group consisting of acrylic acid, methacrylic acid, and mixtures thereof, and (2) from about 85 to about 98, and preferably from about 94 to about 97.5, parts by weight of neutral monomer esters, said neutral monomer esters preferably comprising methyl acrylate or ethyl acrylate and methyl methacrylate. The interpolymer compositions are further characterized by preferably comprising from about 30 to about 55 percent by weight of methyl methacrylate when said alkyl acrylate is methyl acrylate, and from about 52.5 to about 69 percent by weight of methyl methacrylate when said alkyl acrylate is ethyl acrylate.

The heat sealable acrylic-based polyolefin film coating composition of U.S. Pat. No. 4,058,645 comprises a mixture of (1) a resinous interpolymer derived from about 2 to about 15, and preferably from about 2.5 to about 6, parts by weight of an alpha, beta-monoethylenically unsaturated carboxylic acid selected from the group consisting of acrylic acid methacrylic acid and mixtures thereof and from about 85 to about 98, and preferably from about 94 to about 97.5, parts by weight of neutral monomer esters preferably comprising methyl acrylate or ethyl acrylate and methyl methacrylate in admixture with from about 2 to about 15% parts by weight of an aqueous-alkali soluble rosin derivative. The rosin derivative is an adduct of rosin with an alpha, beta-ethylenically unsaturated dicarboxylic acid, the adduct subsequently being partially esterified with a polyhydric alcohol.

In one procedure for bonding the foam and film components to each other, a so-called "dry lamination" technique, the film is provided with a coating of the acrylic adhesive component, e.g., in a layer of from about 0.2 to about 5, and preferably from about 0.5 to about 1.5, mils thick, at some point downstream from the stretching, or orientation, operation. The coating is allowed to dry before the lamination operation. Prior to application of the acrylic adhesive coating, it is preferred to treat the surface of the oriented polypropylene film in order to promote good adhesion of the acrylic adhesive thereto. Known and conventional techniques which can be used to accomplish this include treatment of the film surface by high voltage corona discharge, treatment with chemical oxidizing agents and flame treatment followed, if desired, by application of a primer such as poly(ethylene) imine to enhance adhesion of the acrylic coating still further. Thereafter, the polystyrene foam, e.g., taken from a reel is brought into contact with the adhesive-coated side of the oriented polypropylene film (which can also be taken from a reel) with bonding of the components taking place by application of heat and pressure. The temperature of the bonding operation must be at least that which renders the acrylic adhesive component in the tacky or semi-fluid state but not so high as to adversely affect the properties or integrity of the foam and film components. Suitable bonding temperatures range, e.g., from about 170° F. to about 450° F., and preferably from about 200° F. to about 400° F., and suitable pressures can range from about 10 to about 500 psi, and preferably from about 20 to about 100 psi.

In the examples whioh follow, Example 1 is illustrative of a composite obtained without the use of a heat sealable, or bonding, material. Examples 2 and 3 are illustrative of composites formed with heat sealable materials which are outside the scope of this invention, i.e., low melting point polypropylene copolymer and polyvinylidene chloride (saran), respectively, and Examples 4 and 5 are illustrative of the composite foam/film structure of this invention.

EXAMPLES 1–5

The samples of foam/film composite in these examples were obtained by compression lamination of a sheet of polystyrene foam having a density of 14.8 lb/ft³ and a thickness of 70 mils and a biaxially oriented polypropylene film formed from a standard orientation grade polypropylene. The lamination was carried out in a platten press over a temperature range of 220°–375° F. and a pressure range of 24–490 psi.

The acrylic adhesive component of the composite foam/film structure of Example 4 was obtained in accordance with the disclosure of U.S. Pat. No. 3,753,769. It was prepared as follows:

A reaction vessel was charged with 1.2 liters of water containing 3.0 grams of emulsifier (Gafac RE-610, a mixture of phosphoric acid esters) and 1.8 grams of ammonium persulfate as a polymerization catalyst. The reaction vessel was heated to a temperature of approximately 80° C. with stirring. The following materials were mixed and added incrementally with stirring over a period of 3 hours:
   a. 216 grams of methyl methacrylate
   b. 366 grams of methyl acrylate
   c. 18 grams of methacrylic acid and
   d. 2.2 grams of ethyl mercaptoacetate as a molecular weight regulator.

Following completion of monomer addition, the reaction vessel was maintained at the reaction temperature of 80° C. for an additional 30 minutes. Upon termination of the reaction, the product contained in the reaction vessel consisted of a latex comprising 33 percent solids, i.e., 1 part terpolymer resin to two parts water. While still at a temperature of 80° C. the latex reaction product was diluted with 1.2 liters of water containing dissolved therein 21.2 grams of ammonia. The mixture was stirred for 1 hour at 60° C. to 70° C. and then allowed to cool to room temperature. The product was an ammoniacal aqueous solution of a methyl methacrylate/methyl acrylate/methacrylic acid terpolymer with a viscosity of 20 cps (at 25° C.) and containing 20 percent terpolymer resin and 600 percent of the theoretical amount of ammonia required to neutralize the acid groups of the terpolymer. The dried polymer had an intrinsic viscosity of 0.28 and an acid number of 20.

To the ammoniacal aqueous solution of terpolymer was added (a) 40 parts (per 100 parts of terpolymer resin) of an aqueous dispersion (30 percent solids) of an alkaline stabilized colloidal silica, identified by the trade-name Syton; and (b) 10 parts (per 100 parts of terpolymer resin) of an aqueous dispersion (11 percent solids) of Carnauba wax, resulting in a dispersion of wax and silica in the aqueous ammoniacal solution of the terpolymer composition.

The acrylic adhesive component of the composite foam/film structure of Example 5 was obtained in accordance with the disclosure of U.S. Pat. No. 4,058,645. It was prepared by modifying the foregoing acrylic adhesive by adding to the ammoniacal solution thereof (c) 8 parts (per 100 parts of terpolymer resin) of an adduct of fumaric acid which was partially esterified with ethylene glycol (15% solids) and having a ring-and-ball melting point of 144° C. and an acid number of 135, resulting in a dispersion of wax and silica in the aqueous ammoniacal solution of the terpolymer composition.

The bond strengths between the foam and film components of the composites of Examples 1–5 were evaluated on a scale of 1–4 (1=very good adhesion and 4=essentially no adhesion). In addition, 1×4 inch test strips of the composites of Examples 4 and 5 were measured for bond strength in lbs/in in both the machine direction (MD) and the transverse direction (TD). The results of these tests and particulars regarding the composites and the temperature and pressure conditions of the dry lamination operations are set forth in the tables below:

TABLE 1

COMPOSITE STRUCTURES AND CONDITIONS OF LAMINATION

| Example | Film Thickness (mils) | Heat Sealable Coating | Thickness of Heat Sealable Coating (mils) | Heat Sealable Coating Weight (g/1000 in²) | Contact Temp. (°F.) | Contact Force (psi) |
|---|---|---|---|---|---|---|
| 1A | 1.0 | — | — | — | 230 | 368 |
| 1B | 1.0 | — | — | — | 260 | 48 |
| 1C | 1.0 | — | — | — | 260 | 368 |
| 2A | 1.0 | low melting point polypropylene copolymer | 0.4 | — | 230 | 368 |
| 2B | 1.0 | low melting point polypropylene copolymer | 0.4 | — | 270 | 245 |
| 2C | 1.0 | low melting point polypropylene copolymer | 0.4 | — | 270 | 368 |
| 2D | 1.0 | low melting point polypropylene copolymer | 0.4 | — | 270 | 48 |
| 3 | 1.65 | polyvinylidene chloride | — | 2.5 | 260 | 368 |
| 4A | 1.65 | acrylic composition of U.S. Pat. No. 3,753,769 | — | 0.6 | 260 | 24 |
| 4B | 1.65 | acrylic composition of U.S. Pat. No. 3,753,769 | — | 0.6 | 260 | 24 |
| 4C | 1.65 | acrylic composition of U.S. Pat. No. 3,753,769 | — | 0.6 | 260 | 48 |
| 4D | 1.65 | acrylic composition of U.S. Pat. No. 3,753,769 | — | 0.6 | 260 | 48 |
| 4E | 1.65 | acrylic composition of U.S. Pat. No. 3,753,769 | — | 0.6 | 260 | 368 |
| 4F | 1.65 | acrylic composition of U.S. Pat. No. 3,753,769 | — | 0.6 | 260 | 368 |
| 5A | 0.8 | acrylic composition of U.S. Pat. No. 4,058,645 | — | 0.6 | 260 | 48 |
| 5B | 0.8 | acrylic composition of U.S. Pat. No. 4,058,645 | — | 0.6 | 260 | 368 |

TABLE 2
EVALUATION OF BOND STRENGTHS

| Example | Adhesion Rating (Scale of 1-4) | Adhesion lbs/in MD | TD |
|---------|-------------------------------|--------------------|-----|
| 1A | 3 | TL¹ | TL |
| 1B | 3 | TL | TL |
| 1C | 3 | TL | TL |
| 2A | 4 | TL | TL |
| 2B | 4 | TL | TL |
| 2C | 4 | TL | TL |
| 2D | 4 | TL | TL |
| 3A | 3 | TL | TL |
| 4A | 2 | .6 | .5 |
| 4B | 1 | ND² | ND |
| 4C | 2 | .9 | .6 |
| 4D | 1 | 1.0 | 1.0 |
| 4E | 2 | ND | ND |
| 4F | 1 | ND | ND |
| 5A | 1 | .7 | .7 |
| 5B | 1 | .4 | .6 |

²TL = too low to be measured.
²ND = not determined.

As these data show, the composites prepared with the acrylic adhesive component (Examples 4 and 5) possessed much higher adhesion ratings than the composites prepared without a heat sealable material (Example 1) or those prepared with heat sealable materials outside the scope of this invention (Examples 2 and 3).

What is claimed is:

1. A method for manufacturing a foam/film structure, comprising:
   (a) coating a side of an oriented polypropylene film layer with a heat sealable aqueous latex acrylic adhesive interpolymer of (1) from about 2 to about 15 parts by weight of an alpha, beta-monoethylkenically unsaturated carboxylic acid selected from the group consisting of acrylic acid, methacrylic acid, and mixtures thereof, and (2) from about 85 to about 98 parts by weight of neutral monomer esters;
   (b) drying the heat sealable aqueous latex acrylic adhesive interpolymer;
   (c) contacting at least one major surface of a polystyrene foam substrate with the side of the oriented polypropylene film coated with the dried heat sealable acrylic adhesive interpolymer; and,
   (d) heat sealing the foam/film structure under sufficient bonding temperature and pressure to render the dried heat sealable acrylic adhesive interpolymer tackey or semi-fluid but not so high as to adversely affect the properties or integrity of the polystyrene foam and oriented polypropylene film, said bonding temperature ranging from about 170° to about 450° F. and said pressure ranging from about 10 to about 500 psi.

2. The method of claim 1, wherein said bonding temperature ranging from about 200° to about 400° F. and said pressure ranging from about 20 to about 100 psi.

3. The method of claim 2, wherein said interpolymer component of said heat sealable acrylic adhesive comprising (1) from about 2.5 to about 6 parts by weight of said unsaturated carboxylic acid and (2) from about 94 to about 97.5 parts by weight of said neutral monomer esters selected from the group consisting of methyl acrylate, ethyl acrylate an methyl methacrylate, and said soluble rosin derivative is and adduct of rosin with an alpha, beta-ethylenically unsaturated dicarboxylic acid, said adduct subsequently being partially esterified with a polyhydric alcohol.

4. The method of claim 3, wherein said heat sealable acrylic adhesive is a mixture of said interpolymer in admixture with from about 2 to about 15% parts by weight of an aqueous-alkali soluble rosin derivative.

5. The method of claim 4, wherein the adhesion of the heat sealable acrylic adhesive interpolymer to the oriented polypropylene film is enhanced by treating the surface of the film to which the heat sealable acrylic adhesive interpolymer is to be applied by high voltage corona discharge, flame treatment or treatment with chemical oxidizing agents, or any combination thereto optionally followed by application of a primer to said surface to enhance said adhesion even further.

6. The method of claim 4, wherein the adhesion of the heat sealable acrylic adhesive interpolymer to the oriented polypropylene film is enhanced by treating the surface of the film to which the heat sealable acrylic adhesive interpolymer is to be applied by high voltage corona discharge, flame treatment or treatment with chemical oxidizing agents, or any combination thereto optionally followed by application of poly(ethylene) imine to said surface as a primer to enhance said adhesion even further.

7. The method of claim 1, wherein said oriented polypropylene film layer is biaxially oriented and includes:
   (i) a relatively thick layer of oriented polypropylene, one side of which is applied to said major surface of said polystyrene foam substrate; and,
   (ii) a relatively thin layer of film forming thermoplastic on the other side of said oriented polypropylene layer.

8. The method of claim 7, wherein said relatively thin layer of film-forming resin is selected from the group consisting of polyolefin homopolymer and polyolefin copolymer on said other side of said oriented polypropylene layer.

9. The method of claim 8, wherein said polyolefin homopolymer or copolymer is selected from the group consisting of high pressure low density polyethylene, linear low density polyethylene and a propylene of characteristics different from said oriented polypropylene layer.

10. The method of claim 9, wherein said relatively thick oriented polypropylene layer is an opaque, void-containing polypropylene core, and said relatively thin layer is a transparent, void-free thermoplastic skin based on a polypropylene of similar properties as that used to provide said core layer but lacking the opaquing voids of said core layer.

11. The method of claim 10, wherein said relatively thick polypropylene layer is isotactic polypropylene.

* * * * *